UNITED STATES PATENT OFFICE 2,594,824

BUTADIENE METHYL-o-CHLOROCIN-NAMATE COPOLYMER

Gilbert H. Swart, Akron, Ohio, assignor to The General Tire and Rubber Company, Akron, Ohio, a corporation of Ohio No Drawing. Application August 10, 1946, Serial No. 689,829

1 Claim. (Cl. 260—83.5)

The present invention relates to certain novel compositions of matter. It particularly relates to the copolymerization products of certain halogen-containing substituted ethylenes and conjugated diolefins.

Synthetic rubberlike materials have heretofore been prepared by copolymerizing butadiene compounds, such for example as butadiene-1,3, isoprene, chloroprene, dimethylbutadiene and the like with unsaturated compounds, such as acrylonitrile, styrene, halogenated styrenes, vinyl ethers, methyl methacrylate and the like. The copolymers prepared with a substantial proportion of diene are usually of a rubbery nature and the polymers prepared with a major proportion of the copolymerizable monoolefinic compounds are ordinarily more of a resinous nature. Certain properties of the copolymer depend on the particular monomeric materials from which it was prepared. Thus, the rubbery copolymers containing chloroprene and/or acrylonitrile usually have considerably greater resistance to oil than do other copolymers. The copolymers containing dichlorostyrene have marked heat resistance and flex resistance. Certain copolymers of methyl methacrylate have exceptionally desirable processing characteristics.

It has not heretofore been possible, as far as I am aware, to obtain desirable properties of the various copolymers, such as heat resistance and flex resistance, the desirable processing characteristics, oil resistance, etc. in a single copolymer although a copolymer having all such properties is highly desirable.

It is an object of the present invention to obtain copolymerization products of improved heat resistance and flex resistance which may also have high resistance to deterioration by oils and good processing characteristics.

It is another object of the present invention to provide rubbery copolymers of a butadiene compound and an olefinic compound which have high tensile strength, relatively good flexing properties, and which may have the desirable properties of several widely different copolymerization products.

It is a further object of the present invention to provide a method of preparing polymerization products and copolymerization products which have improved properties.

In accordance with the present invention copolymers having improved properties are obtained by copolymerizing or interpolymerizing one or more butadiene compounds with one or more compounds having the general formula

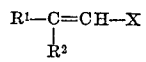

where X is a member of the group selected from

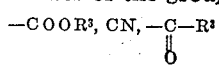

and

where $R^1$ is a monohalogenated or polyhalogenated cyclic group which may or may not have one or more substituents such as alkyl and aryl groups. It is preferably one selected from ring-halogenated aryl, ring-halogenated aralkyl, ring-halogenated heterocyclic groups. $R^2$ is selected from hydrogen and alkyl groups, and $R^3$ is a hydrocarbon group preferably selected from alkyl and aryl groups. The compounds having polyhalogenated cyclic groups such as di and trichlorophenyl, di and triflorphenyl, etc. generally give a somewhat greater improvement to the rubbery polymer than the monohalogenated cyclic groups.

Compounds of the above general formula include beta-substituted acrylic acid esters (inculding the beta alkyl acrylic acid esters) having the formula

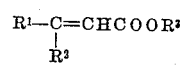

the beta-substituted acrylonitriles having the formula $R_1CH=CHCN$; the substituted vinyl ketones, i. e. the condensation products of ring-chlorinated aldehydes, such as the chlorinated aromatic aldehydes or chlorinated heterocyclic aldehydes, with ketones, of the formula

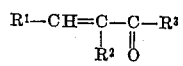

the beta-substituted acrylamides having the formula

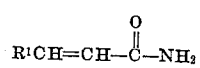

and the beta-substituted N-substituted acrylamides, and beta-substituted N-N-disubstituted acrylamides having the formula

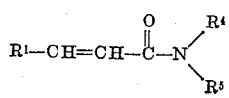

where $R^4$ and $R^5$ are selected from hydrogen and substituted and unsubstituted alkyl, aryl, heterocyclic, aralkyl, arheterocyclic and heterocyclic alkyl. $R_4$ and $R_5$ may be divalent aliphatic groups such as alkylene, etc., which may be joined together to provide with nitrogen a closed ring structure such as a pyridyl group.

Examples of suitable polymerizable beta-substituted acrylic esters which may be copolymerized with one or more butadiene compounds to produce desirable copolymers are:

Methyl β-(5-ethyl-3-chloro-2-pyridyl)-acrylate;
Methyl β-(3,5-dichloro-2-pyridyl)-acrylate;
Methyl β-(4-chloro-2-furyl)-acrylate;
Methyl β-(3,4-dichloro-2-furyl)-acrylate;
Methyl β-(6-chloro-2-quinolyl)-acrylate;
Methyl β-(4,6-dichloro-2-quinolyl)-acrylate;
Ethyl β-(dichloronaphthyl)-acrylate; and
Methyl β-(chlorothiophenyl)-acrylate Examples of the beta-substituted acrylonitriles, which form highly desirable rubbery copolymers with butadiene-1,3 and other butadiene compounds, are:

β-(chlorophenyl)-acrylonitrile;
β-(dichlorophenyl)-acrylonitrile;
β-(5-ethyl, 3-chloro-2-pyridyl)-acrylonitrile;
β-(3,5-dichloro-2-pyridyl)-acrylonitrile; and
β-(5-chloro-2-furyl)-acrylonitrile;
β-(dichlorothiophenyl)-acrylonitrile; and
β-(chloronaphthyl)-acrylonitrile.

Examples of desirable substituted unsaturated ketones within the above general formula are: dichlorobenzalacetone; o-chlorobenzalacetone; p-chlorobenzalacetone; dichlorobenzalacetophenone; o-chlorobenzalacetophenone; p-chlorobenzalacetophenone; 4-chlorofurfuralacetone; 3,4-dichlorofurfuralacetone; 4-chloropyridylacetophenone; 4-chlorofurfuralacetophenone; dichloralphapicolenylacetophenone; chlorogammapicolenylacetophenone; and 3,4-dichlorofurfuralacetophenone.

Examples of the beta-substituted acrylamides, beta-substituted and N-substituted acrylamides, and beta-substituted and N,N-disubstituted acrylamides are:

β-(chlorophenyl)-N-methylacrylamide;
β-(chlorophenyl)-N,N-dimethylacrylamide;
β-(dichlorophenyl)-N-methylacrylamide;
β-(4-chloropyridyl-2)-N-methylacrylamide; and
β-(3,5-dichloro-2-pyridyl)-N-methylacrylamide.

It is generally true that in any copolymer system the properties of the copolymer will very with the relative proportions and types of the co-monomers as well as with the methods and conditions of polymerization. This is also true in the present instance when one or more of the compounds within the above general formula is copolymerized with a butadiene compound, with or without other copolymerizable materials such as the aforementioned acrylonitrile, styrene, halogenated arylvinyl compounds, such as para-chloro-alpha-methylstyrene, 3,4- and 3,5-dichloro-alpha-methylstyrenes, the various ring-chlorinated styrenes, methyl methacrylate, trifluromethylstyrenes, etc.

The rubberlike properties of the copolymers of the present invention are, as generally recognized, more pronounced when the copolymer contains 45 or 50% or more by weight of butadiene compound or compounds. It is therefore preferred when copolymers having rubberlike properties, similar to those obtained with natural rubber, are desired to utilize about 45 or 50% to about 80 or 95% by weight of the diene and from about 15 or 20% to 50 or 55% by weight of one or more copolymerizable monomeric materials within the above general formula, or a mixture of one or more monomeric materials with other copolymerizable monoolefinic compounds. It is also within the purview of my invention to provide mixtures of one or more dienes and one or more of the compounds of the above general formula having dienes in any desired proportion since useful properties may be obtained in either case. As little as 5% of the aforementioned halogenated aryl substituted compounds noticeably improve the properties of the copolymer.

The preparation of polymerization products of the present invention may be accomplished by polymerizing the mixture of monomers in any convenient manner, either en masse with or without a compatible solvent or diluent, or as an emulsion or suspension in aqueous or other immiscible liquid, which may or may not contain an emulsifying agent. When the polymerization is carried out en masse a suitable catalyst and a somewhat elevated temperature are usually used. The polymerization catalyst is usually of the type recognized as initiating vinyl type polymerization by formation of free radicals. They are usually accomplished by monomer soluble oxidizing agents or reducing agents, carbonium ions or the like when mass polymerization systems are used.

Emulsion polymerization is generally preferred as it usually gives copolymers of superior properties. The mixture of polymerizable monomers is emulsified in water containing a suitable emulsifying agent and a suitable catalyst for accelerating or initiating polymerization as recognized by those skilled in the art. A modifying agent such as a relatively long-chain mercaptan may or may not be present to modify the properties of the copolymer material obtained. The polymerization product is obtained in the form of a latex-like emulsion or dispersion which may be used as such or may be coagulated by substantially the same methods used for the coagulation of rubber latices, for example by the addition of alcohol, an acid, a salt, or a mixture of such coagulants. A stabilizing agent or antioxidant is preferably added to the latex prior to coagulation.

The emulsifying agents may be of the anionic or cationic type. Ordinary soaps, such as sodium and potassium stearate or oleate and other alkali metal salts of long-chain saturated or unsaturated acids, and the alkyl sodium sulfates, such as sodium lauryl sulfate, etc., are especially desirable.

To obtain fast speeds in polymerization we prefer an activated system employing a complex compound of cobalt or an iron compound together with a suitable cooperating material such as dodecyl mercaptan, and/or other compounds that cooperate with the metal compound to cause acceleration of the polymerization reaction. Such systems of polymerization, any of which may be used in the polymerization of the compounds of the present invention, are more particularly described in the copending application of John C. Warner and Harry Seltz, Serial No. 687,954 filed August 2, 1946.

The following examples, in which parts are by weight, illustrate the invention:

*Example 1*

25 grams of β-(P-chlorophenyl)-, N-methylacrylamide, 75 grams of butadiene-1,3, 4 grams sodium stearate, .1 gram potassium persulfate, .5 gram Tamol R-100, 3 grams sodium silicate, .1 gram dodecylmercaptan, .1 potassium cobaltinitrite. The mixture of the above is agitated at 40° C. for a few hours or until polymerization is largely complete. The latex, when coagulated and dried in the usual way, yields a plastic rubber having relatively high tensile strength and crack resistance during flexing.

*Example 2*

30 grams of methyl-o-chlorocinnamate and 70 grams of butadiene-1,3 were emulsified in a solution of 2 grams of soap flakes in 180 grams of water. The emulsion contained, besides the above mentioned materials, .075 gram $K_2S_2O_8$, 0.5 gram Tamol-R-100 (the condensation product of naphthalene sulfonic acid and formaldehyde), 0.3 gram $Na_2SiO_3$, .04 gram dodecylmercaptan, 0.1 gram Sulfole B-8 (tertiary C-12 mercaptan), and .07 gram $K_3CO(NO_2)_6$. The mixture was agitated for 20 hours at a temperature of 40° C. The resulting latex was coagulated and the coagulum washed and dried in the usual way, yielding 94 grams of a plastic synthetic rubber which, when compounded in a tread stock formula, had a tensile strength of 4200 lbs./sq. in. at room temperatures and 1280 lbs./sq. in. at 205° F.

When methyl cinnamate was used in place of methyl-o-chlorocinnamate only 78 grams of synthetic rubber were obtained after 20 hours at 40° C. and its tensile strength after compounding in the same tread stock formula was only 3015 lbs./sq. in. at room temperatures and 665 lbs./sq. in. at 205° F.

*Example 3*

When dichloromethyl cinnamate was used in place of methyl-o-chlorocinnamate in Example 1, 99 grams of a plastic synthetic rubber were obtained after polymerizing 24 hours at 40° C. After compounding in a tread recipe substantially identical with that advocated by the Rubber Reserve Corporation for evaluating synthetic rubbers, this synthetic rubber had a tensile strength of 3900 lbs./sq. in. at room temperature and 1355 lbs./sq. in. at 205° F.

*Example 4*

30 grams of o-chloro-cinnamonitrile and 70 grams of butadiene-1,3 were emulsified in a solution of 2 grams of soap flakes in 180 grams of water. The emulsion, in addition to the above mentioned materials, also contained .075 gram $K_2S_2O_8$, 0.3 gram $Na_2SiO_3$, 0.5 gram Tamol R-100, .04 gram dodecylmercaptan, 0.1 gram Sulfole B-8 (tertiary C-12 mercaptan), and .07 gram $K_3CO(NO_2)_6$. After agitating for 12 hours at 45° C. the resulting latex yielded 97 grams of synthetic rubber. This synthetic rubber after compounding in a tread recipe had a tensile strength of 4430 lbs./sq. in. at room temperature and 1300 lbs./sq. in. at 205° F. The resistance to flexing was high and the heat build-up or hysteresis was very low.

*Example 5*

30 grams of ortho-chlorobenzalacetone and 70 grams of butadiene-1,3 were emulsified in a solution of 5 grams of soap flakes in 180 grams of water. In addition to the above mentioned materials, the emulsion contained 0.3 gram $K_2S_2O_8$ and 0.4 gram dodecyl mercaptan. After agitating for 18 hours at 50° C. the resulting latex yielded 92 grams of synthetic rubber. After compounding in a tread recipe, this rubber had a tensile strength of 3635 lbs./sq. in. at room temperature and 1040 lbs./sq. in. at 205° F. The rubber was also oil resistant.

When unsubstituted benzalacetone was used in place of ortho-chlorobenzalacetone in the above example, a yield of 88 grams was obtained after 18 hours at 40° C. After compounding this rubber in the same tread recipe as above, tensile strengths of only 2795 lbs./sq. in. at room temperature and 695 lbs./sq. in. at 205° F. were obtained.

In the above examples, butadiene may be substituted in whole or in part by one or more butadiene compounds such as chloroprene, cyanoprene, isoprene, piperylene, 2,2-dimethylbutadiene, as well as other polymerizable diolefinic compounds having conjugated double bonds and less than nine carbon atoms. The copolymerizable olefinic compounds may be substituted in whole or in part by the other compounds aforementioned to give rubbery polymers also having desirable properties. An additional copolymerizable mono-olefinic compound such as the aforementioned styrene, acrylonitrile and other compounds containing the group >C=C<, wherein one of the free valences is attached directly to an activating group such for example as —CN, —COOR, aryl, etc., may also be present to modify the properties of the resulting polymer. When it is desired to produce a hard resin, the butadiene may be reduced or even eliminated to provide polymers or copolymers comprising one or more of the compounds within the aforementioned general formula, with or without one or more non-chlorine-containing polymerizable mono-olefins.

It is understood that variations and modifications of the specific products and processes shown herein and described for purposes of illustration may be made without departing from the spirit of the invention.

What I claim is:

A vulcanizable copolymerization product of a mixture comprising butadiene and a methyl-o-chlorocinnamate, said mixture comprising 45% to 95% of butadiene and 55% to 5% of said methyl-o-chlorocinnamate.

GILBERT H. SWART.

REFERENCES CITED

The following references are of record in the file of this patent:

UNITED STATES PATENTS

| Number | Name | Date |
|---|---|---|
| 2,425,269 | Seymour | Aug. 5, 1947 |
| 2,437,980 | Seymour | Mar. 16, 1948 |